United States Patent

Asaba et al.

[11] Patent Number: 5,029,931
[45] Date of Patent: Jul. 9, 1991

[54] WINDSHIELD MOLDING INSTALLATION ARRANGEMENT

[75] Inventors: Kazuhiro Asaba, Nagoya; Shoji Inoue, Chiba; Yuji Nagahashi, Chiba, all of Japan

[73] Assignees: Aichi Kikai Kogyo Kabushiki Kaisha, Nagoya; Kinugawa Gomu Kogyo Kabushiki Kaisha, Chiba, both of Japan

[21] Appl. No.: 520,502

[22] Filed: May 8, 1990

[30] Foreign Application Priority Data

Jun. 5, 1989 [JP] Japan .................................. 1-65574

[51] Int. Cl.⁵ .............................................. B60J 5/02
[52] U.S. Cl. .................................... 296/93; 296/213; 296/154; 49/476; 49/491
[58] Field of Search ................ 296/93, 213, 154, 908; 49/495, 476, 490, 491, 497

[56] References Cited

U.S. PATENT DOCUMENTS

| 3,118,701 | 1/1964 | Peras | 296/213 X |
|---|---|---|---|
| 3,666,316 | 5/1972 | Wilfert | 296/213 X |
| 3,938,856 | 2/1976 | Janssen | 296/154 |
| 4,496,186 | 1/1985 | Tuchiya et al. | 49/491 X |
| 4,656,784 | 4/1987 | Brachmann | 49/491 |
| 4,787,668 | 11/1988 | Kawase et al. | 49/491 X |
| 4,892,351 | 1/1990 | Ono et al. | 296/213 |
| 4,907,838 | 3/1990 | Reaney | 296/146 X |
| 4,918,867 | 4/1990 | Hayashi et al. | 49/491 X |
| 4,919,471 | 4/1990 | Seino et al. | 49/476 X |

FOREIGN PATENT DOCUMENTS

| 3046457 | 7/1982 | Fed. Rep. of Germany | 296/213 |
|---|---|---|---|
| 3150027 | 6/1983 | Fed. Rep. of Germany | 296/213 |
| 3422625 | 12/1985 | Fed. Rep. of Germany | 296/213 |
| 3528201 | 2/1986 | Fed. Rep. of Germany | 296/146 |
| 30640 | 2/1982 | Japan | 296/213 |

Primary Examiner—Johnny D. Cherry
Assistant Examiner—Joseph D. Pape
Attorney, Agent, or Firm—Dennison, Meserole, Pollack & Scheiner

[57] ABSTRACT

A strip of molding which is installed on the side edge of windshield glass, being insertingly mounted on one end of a strip of channel having a U-shaped cross section, and being able to be installed together with a strip of drip seal, permitting to reduce installation time and create a neat appearance. A connective portion which comes in contact with the drip seal can be provided in the cross section of the windshield molding so that any abnormal sounds will be eliminated.

5 Claims, 1 Drawing Sheet 5,029,931

WINDSHIELD MOLDING INSTALLATION ARRANGEMENT

BACKGROUND OF THE INVENTION

This invention relates to an installation arrangement of a strip of windshield molding which is mounted on the side edge of windshield glass.

In the prior art, the seal mechanism between the front door 51 and the windshield glass W as sectioned on line B—B of FIG. 3, for example, is as shown in FIG. 4.

To effect a good seal between the front door 51 and the car body and to prevent the intrusion of water therein, a strip of drip seal 54 is mounted on the front pillar 52 by an L-shaped fixture 53 which is attached to the front pillar 52 by clips 57. In addition, a strip of windshield molding 56, the inside of which is reinforced by stainless steel 55, is mounted on the side edge of the windshield glass W.

Since the windshield molding 56 and drip seal 54 are separately installed, it is therefore a problem with the prior art that the man-hours necessary for the installation thereof is inevitably increased. The prior art also has problems such as increased manufacturing cost due to the injection molding manufacturing method and an abnormal sound caused by contact between the front door 51 and the windshield molding 56.

SUMMARY OF THE INVENTION

Accordingly, an object of the present invention is to provide a windshield molding installation arrangement whereby to reduce the man-hours necessary for the installation thereof and to improve the mounting work efficiency.

Another object of the present invention is to provide a windshield molding installation arrangement whereby to ensure a neat post-installation appearance.

A further object of the present invention is to provide a windshield molding installation arrangement wherein any abnormal sounds can be eliminated.

The foregoing objects of the invention are accomplished by providing a windshield molding installation arrangement wherein a strip of windshield molding installed on the side edge of the windshield glass is insertingly mounted on one end of a strip of channel having a U-shaped cross section, the channel for attaching to a car body a strip of drip seal which comes in contact with the front door.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

One embodiment in conformity with this invention will follow by referring to the associated drawings.

Figure 1:
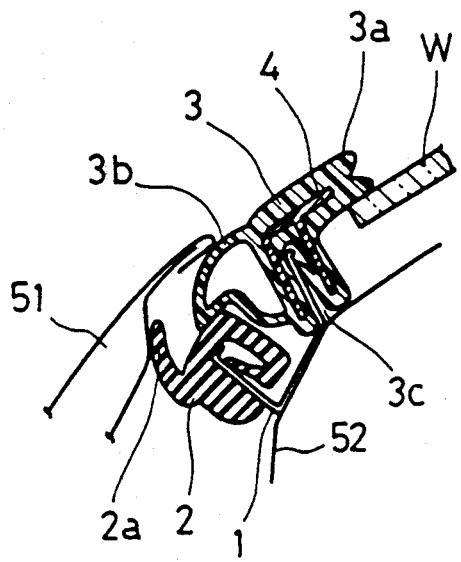
FIG. 1 is a cross sectional view taken on line B—B of FIG. 3 which shows an embodiment of the present invention.
Figure 3:
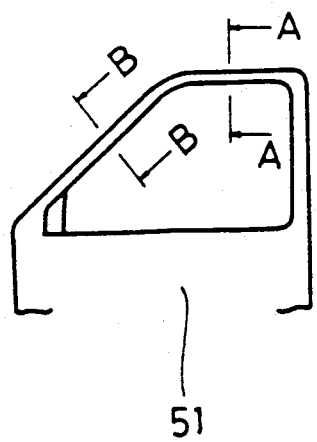
FIG. 3 is a side view of a front door embodying the present invention.
Figure 4:
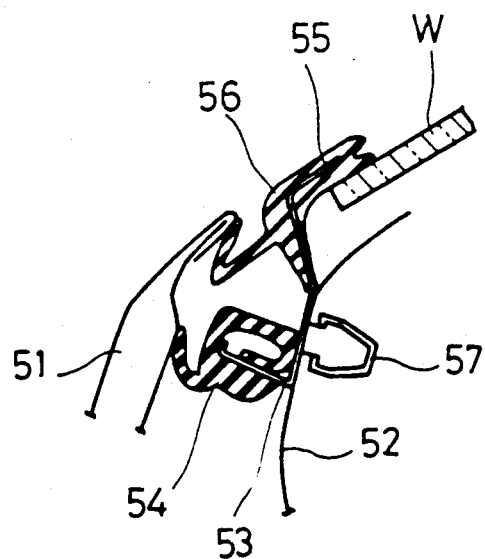
FIG. 4 is a cross sectional view of the prior art corresponding to FIG. 1.

In FIG. 1, which is a cross sectional view taken on the line B—B of FIG. 3, mounted between the front end of the front door 51 and the side edge of the windshield glass W are a strip of drip seal 2 and a strip of windshield molding 3 both of which are supported together as a unit by a piece of channel having a quasi-U-shaped cross section which then is bonded by such a means as welding to a front pillar 52 which constitutes part of the car body. In other words, the drip seal 2 can be insertingly mounted on one end of the U-shaped channel 1 while the windshield molding 3 can be insertingly mounted on the other end.

This windshield molding 3 is made of soft vinyl chloride and is extruded to a shape having a retainer portion 3a which contacts the front surface of the windshield glass W when insertingly mounted on one end of the channel 1, a hollow connective portion 3b which comes in contact with the aforementioned drip seal 2, and the grooved portion 3c into which one projecting end of the channel can be inserted. Provided inside the windshield molding is a piece of hard vinyl chloride reinforcement 4 which is an integral part thereof. This reinforcement 4 can be simultaneously extruded together with the aforementioned retainer portion 3a, hollow connective portion 3b and grooved portion 3c at a low manufacturing cost.

The windshield molding 3 is extruded to the aforementioned shape and is mounted insertingly on the end of the channel 1 so that the aforementioned retainer portion 3a well retains the side edge of the windshield glass W while the aforementioned connective portion 3b comes in contact, seemingly as one single member, with the drip seal 2. Thus, a good seal between the windshield W and the front door 51 is obtained and the windshield molding 3 and the drip seal 2 are assembled leaving no gaps therebetween, thus prohibiting any abnormal sound such as wind whistling.

The drip seal 2 can effectively prevent the entry of water at the front door similarly as in the prior art. Since the drip seal 2 and the windshield molding 3 are yet independent components, the mounting arrangement of this invention permits to effectively deal with uneven contacts between the front door 51 and the windshield W due to variations in fitting work by adjusting, for example, the flange angles of the U-shaped channel 1. Further, the channel 1 can be bonded by such a means as welding to the car body thus enabling the exclusion of the clips 57 which are used in the prior art.

The windshield molding 3 is mounted together as a unit with drip seal 2 on the channel 1 so that the installation can be achieved with ease and reduced man-hours and a considerably neater appearance can be achieved as well. Further, the windshield molding 3 can be extruded so that the manufacturing cost will be greatly reduced and the extruded connective portion 3b can be of elastic material which eliminates an abnormal sound by improving contact between the front door 51 and the windshield molding 3.

Figure 2:
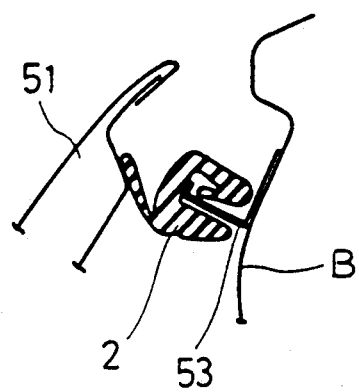
FIG. 2 is a cross sectional view taken on line A—A of FIG. 3.

FIG. 2 is a cross sectional view taken on line A—A of FIG. 3.

In the area shown in FIG. 2 where the windshield glass is absent, only the drip seal 2 is provided between the car body B and the front door 51. This drip seal 2 is supported by a strip of L-shaped fixture 53 which is attached to the car body B. Accordingly, the U-shaped channel 1 is used only for the portion of drip seal 2 provided along the side edge of the windshield glass W so that the windshield molding 3 can be assembled by easily mounting itself on one end of this channel 1.

What is claimed is:

1. A windshield molding and door drip seal assembly for installation on an automotive vehicle body adjacent and between a windshield side edge and a front edge of a front door of the vehicle body, comprising:
    an elongate channel member fixedly mountable on the vehicle body between the windshield side edge and the door front edge, said channel member being of a generally U-shaped configuration in cross section with laterally spaced first and second flanges;
    a drip seal mounted on said first flange for positioning between and sealing between the vehicle body and the door front edge;
    a windshield molding including a grooved portion receiving said second flange of said channel member therein and mounting said windshield molding on said channel member, a hollow connective portion integral with said grooved portion and extending toward and into overlying contact with said drip seal to define a seal between said window molding and said drip seal without a gap therebetween, and a solid retainer portion on said windshield molding integrally formed with said grooved portion and extending therefrom and generally opposed from said connective portion for contacting and retaining the side edge of the windshield.

2. The assembly of claim 1 wherein said windshield molding is an extrusion of soft vinyl chloride, and a reinforcing extrusion of hard vinyl chloride integrally formed within and simultaneous with said windshield molding and extending along said groove portion and said retainer portion for reinforcement thereof.

3. In an automotive vehicle, a windshield with a side edge, and a front door with a front edge in spaced adjacent relation to said windshield side edge, a vehicle body pillar means positioned generally between and laterally of said side edge and said front edge, an elongate mounting channel member fixedly secured to said pillar means and including first and second flanges extending generally laterally toward said edges, a drip seal mounted on said first flange and extending therefrom into sealing engagement with the door front edge;
    a windshield molding including a grooved portion receiving said second flange of said channel member therein and mounting said windshield molding on said channel member, a hollow connective portion integral with said grooved portion and extending therefrom and into overlying sealing contact with said drip seal to define a seal between said window molding and said drip seal without a gap therebetween, and a retainer portion on said windshield molding integral with said grooved portion and extending therefrom generally opposed from said connective portion and into overlying contacting and retaining relation to said windshield side edge.

4. The construction of claim 3 wherein said channel member, said drip seal and said windshield molding comprise a unitary installation, said separately formed drip seal and windshield molding accommodating adjustment of said flanges relative to each other while maintaining the seal between said window molding and said drip seal without a gap therebetween.

5. The construction of claim 4 wherein said windshield molding is an extrusion of soft vinyl chloride, and a reinforcing extrusion of hard vinyl chloride integrally formed within and simultaneous with said windshield molding and extending along said grooved portion and said retainer portion for reinforcement thereof.

* * * * *